W. M. & R. SAVAGE.
DEVICE FOR SLAUGHTERING HOGS.
No. 62,158. Patented Feb. 19, 1867.
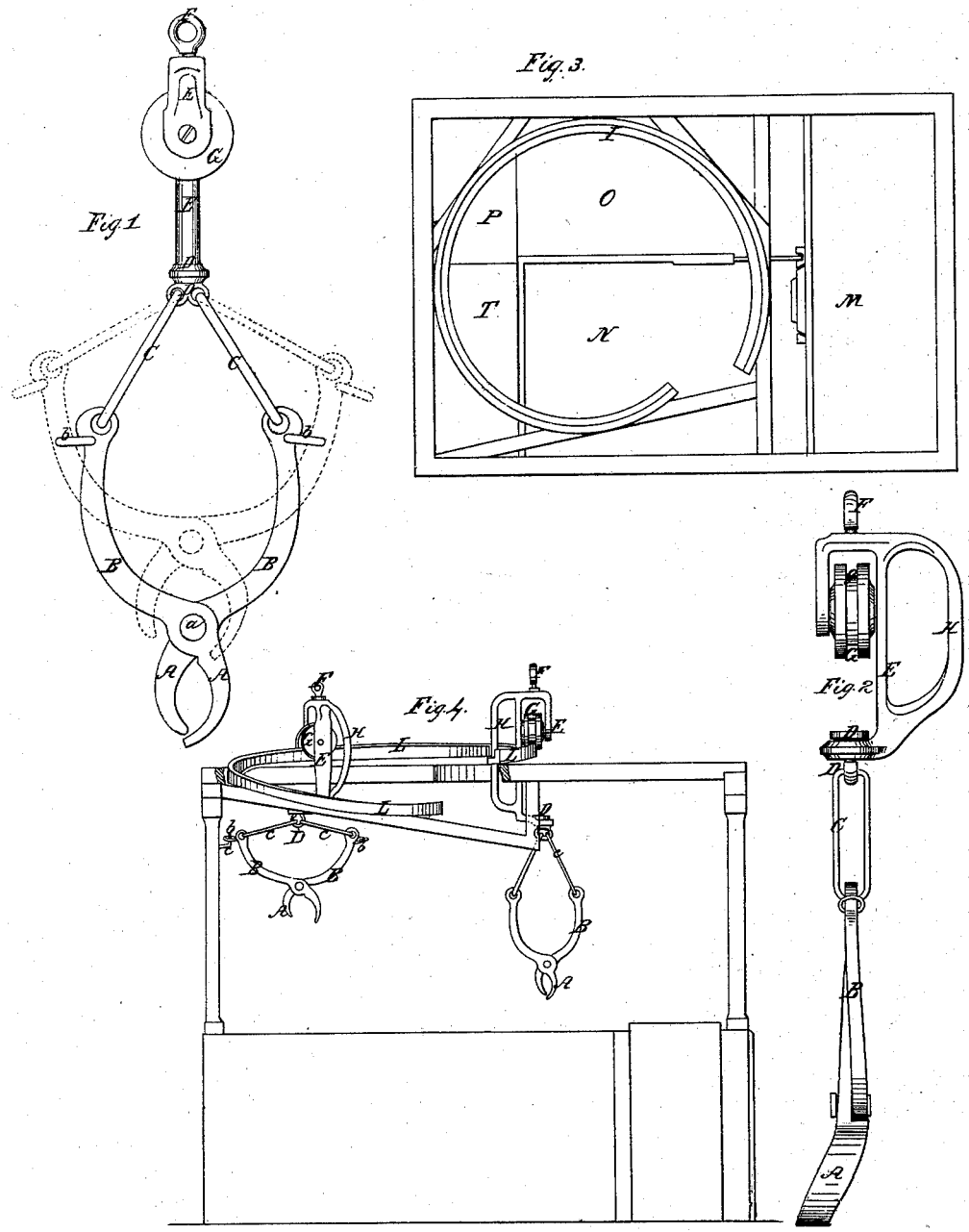

United States Patent Office.

WILLIAM M. AND RICHARD SAVAGE, OF CHICAGO, ILLINOIS.

Letters Patent No. 62,158, dated February 19, 1867.

---

IMPROVEMENT IN DEVICE FOR SLAUGHTERING HOGS.

---

The Schedule referred to in these Letters Patent and making part of the same.

---

TO ALL WHOM IT MAY CONCERN:

Be it known that we, WILLIAM M. SAVAGE and RICHARD SAVAGE, of Chicago, in the county of Cook, and State of Illinois, have invented a certain new and useful Improvement in Apparatus for Slaughtering Purposes; and we do hereby declare and make known that the following is a full, clear, and exact description of the same, reference being had to the accompanying drawings, and to the letters and figures marked thereon, which form part of this specification.

Our invention relates more especially to an apparatus used in the slaughtering swine, whereby the hogs are caught by one of the hind legs, and raised up, and suspended upon a suitable supporting track, head downwards, while alive, in which position they are stuck and bled; said track being so curved and arranged that, after being bled, the animal is moved readily around to a position convenient to the scalding-vat, where he is released from the clutch and dropped into said vat, and the clutch returns automatically to the point where it is to be used in repeating the operation.

To enable others skilled in the art to understand how to construct and use our invention, we will proceed to describe the same with particularity, making reference in so doing to the aforesaid drawings, in which—

Figure 1 represents a front elevation of our improved clutch.

Figure 2 is a side elevation of the same.

Figure 3 is a plan or top view of the apparatus in connection with which said clutch is used; and Figure 4 is a side elevation of the same.

The same letters of reference in the several figures denote the same parts of our invention.

A B represent the clutch or nippers, for grasping the leg of the hog, A being the jaws thereof and B the handles, crossing each other, and riveted at $a$. The jaws are arranged obliquely with respect to the handles, upon one side, as shown in fig. 2, so that the weight of the animal will hang plumb, or nearly so, thus avoiding the liability and danger of breaking the hog's leg, which would otherwise be the case. At the ends of the handles B two links or chains, or their equivalent, marked C, are attached, which are also attached to a swivel-block, D, secured in the hook E, as shown. Said hook E is provided with a handle, H, and a swivelled eye, F, whereunto any suitable hoisting tackle may be secured, to raise up the hog as desired; and is also provided with a friction-roller, G, having a groove, $g$, which fits upon the aforesaid curved track, marked L, to insure and facilitate the movement of the device around upon said track as desired. M represents the pen in which the swine are kept, and from which they are, from time to time as required, driven into the compartment N, in which they are caught to be raised up and suspended upon the track L, by means of the hereinbefore-described clutch and suitable hoisting tackle. As the track L is inclined from the point where the hog is suspended to the opposite end thereof, the struggles of the animal cause him to move along over the pen or floor O, where he is stuck and bled, and after bleeding, having then reached the point where he is to be dropped into the scalding-vat, when the operator attaches one of the links $b$, upon the clutch handles, to the hook or pin $c$, upon the frame, and draws out upon the other arm or handle of the clutch, thus releasing the hog therefrom, which falls upon a slide or chute, P, whence he slides down into the scalding-vat as desired, as shown at T, while the clutch moves on to the end of the track, or that part which is convenient to the catching-pen, where it is used again as before, enough of said clutches being employed to dispose of the hogs as fast as practicable. Instead of releasing the hog from the clutch, as before mentioned, the track L may terminate, or have a break in it, at the point where the hog is dropped, so that the clutch itself drops from the track with the hog.

Having described the construction and operation of our invention, we will specify what we claim, and desire to secure by Letters Patent:

1. We claim the combination of the clutch A B and chains C, or their equivalent, with a swivelled hook, E, substantially as and for the purpose specified.

2. In combination with the above, we claim the anti-friction roller G, arranged as and for the purposes described and set forth.

3. We claim the combination of the said clutch and its appendages with a curved inclined supporting-track, L arranged as and for the purposes shown and specified.

WM. M. SAVAGE,
RICHARD SAVAGE.

Witnesses:
W. E. MARRS,
J. W. HERTHEL.